(12) United States Patent
Mizoguchi et al.

(10) Patent No.: US 9,523,290 B2
(45) Date of Patent: Dec. 20, 2016

(54) RANKINE CYCLE

(75) Inventors: Shinichiro Mizoguchi, Atsugi (JP);
Satoshi Ogihara, Atsugi (JP);
Hirofumi Wada, Isesaki (JP)

(73) Assignee: SANDEN HOLDINGS CORPORATION, Isesaki-Shi (JP)

( * ) Notice: Subject to any disclaimer, the term of this patent is extended or adjusted under 35 U.S.C. 154(b) by 267 days.

(21) Appl. No.: 14/348,217

(22) PCT Filed: Jul. 24, 2012

(86) PCT No.: PCT/JP2012/068637
§ 371 (c)(1),
(2), (4) Date: May 29, 2014

(87) PCT Pub. No.: WO2013/046888
PCT Pub. Date: Apr. 4, 2013

(65) Prior Publication Data
US 2014/0250889 A1    Sep. 11, 2014

(30) Foreign Application Priority Data

Sep. 30, 2011  (JP) ................. 2011-216752

(51) Int. Cl.
*F01K 17/06* (2006.01)
*F01K 5/02* (2006.01)
(Continued)

(52) U.S. Cl.
CPC ............. *F01K 17/06* (2013.01); *F01K 5/02* (2013.01); *F01K 23/065* (2013.01); *F01K 23/10* (2013.01); *F01K 23/14* (2013.01); *F02G 5/04* (2013.01); *F01P 2060/16* (2013.01); *F02G 2260/00* (2013.01); *Y02T 10/166* (2013.01)

(58) Field of Classification Search
None
See application file for complete search history.

(56) References Cited

U.S. PATENT DOCUMENTS 7,181,919 B2  2/2007  Uno et al.
7,690,213 B2  4/2010  Inaba
(Continued)

FOREIGN PATENT DOCUMENTS

CN  1677022 A    10/2005
CN  101033707 A   9/2007
(Continued)

OTHER PUBLICATIONS

English translation of JP 2012159065 obtained from http://worldwide.espacenet.com on Feb. 8, 2016 "JP_2012159065_English_Translation_Espacenet" (17 pages).*
(Continued)

*Primary Examiner* — Hoang Nguyen
(74) *Attorney, Agent, or Firm* — Foley & Lardner LLP

(57) ABSTRACT

A Rankine cycle includes a refrigerant pump, a heat exchanger, an expander and a condenser. The Rankine cycle further includes a clutch provided in a power transmission path extending from an engine to the refrigerant pump. Prior to the operation of the Rankine cycle and during the deceleration of the vehicle, the clutch is fastened and the refrigerant pump is driven with use of the vehicle inertia force.

10 Claims, 11 Drawing Sheets

(51) Int. Cl.
*F01K 23/06* (2006.01)
*F01K 23/10* (2006.01)
*F02G 5/04* (2006.01)
*F01K 23/14* (2006.01)

(56) References Cited

U.S. PATENT DOCUMENTS

2005/0217288 A1\* 10/2005 Uno ........................ B60H 1/32
                                                                                 62/157
2010/0090476 A1    4/2010  Wada

FOREIGN PATENT DOCUMENTS

| JP | 2005-313878 A | 11/2005 | | |
|---|---|---|---|---|
| JP | 2008-274834 A | 11/2008 | | |
| JP | 2012159065 | \* | 2/2011 | ........... Y02T 10/166 |

OTHER PUBLICATIONS

Chinese Office Action Feb. 12, 2015, 6 pages.

\* cited by examiner

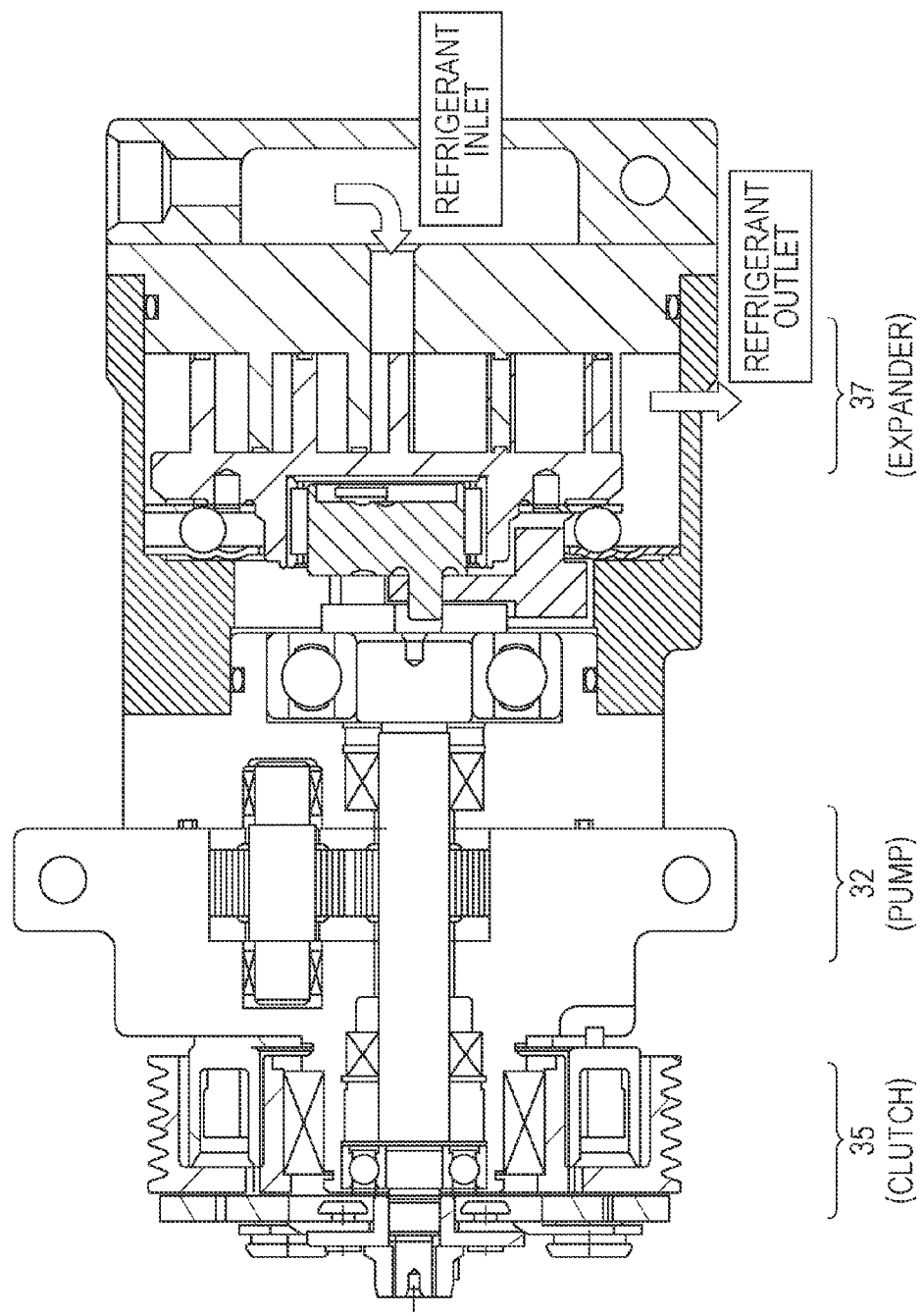

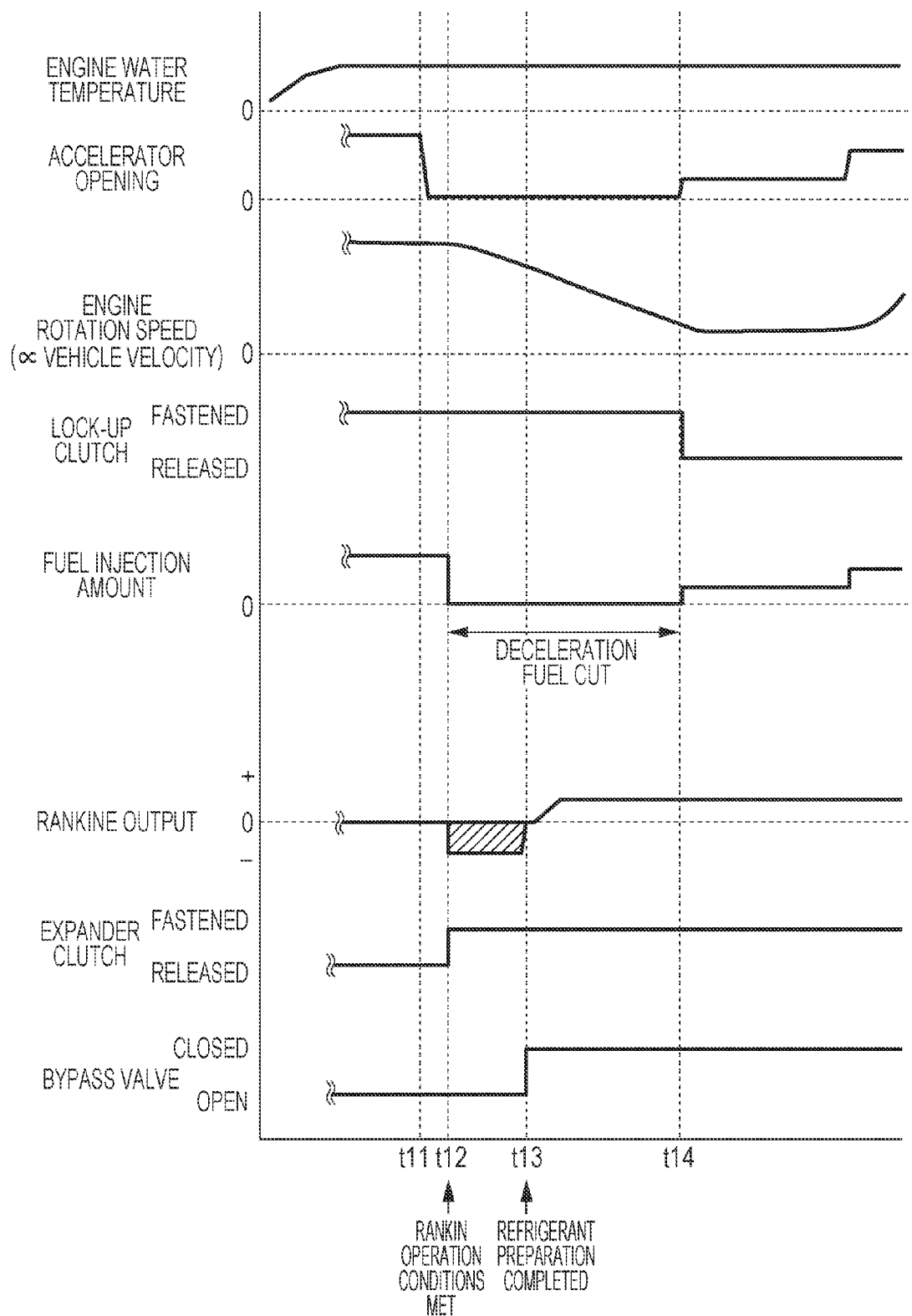

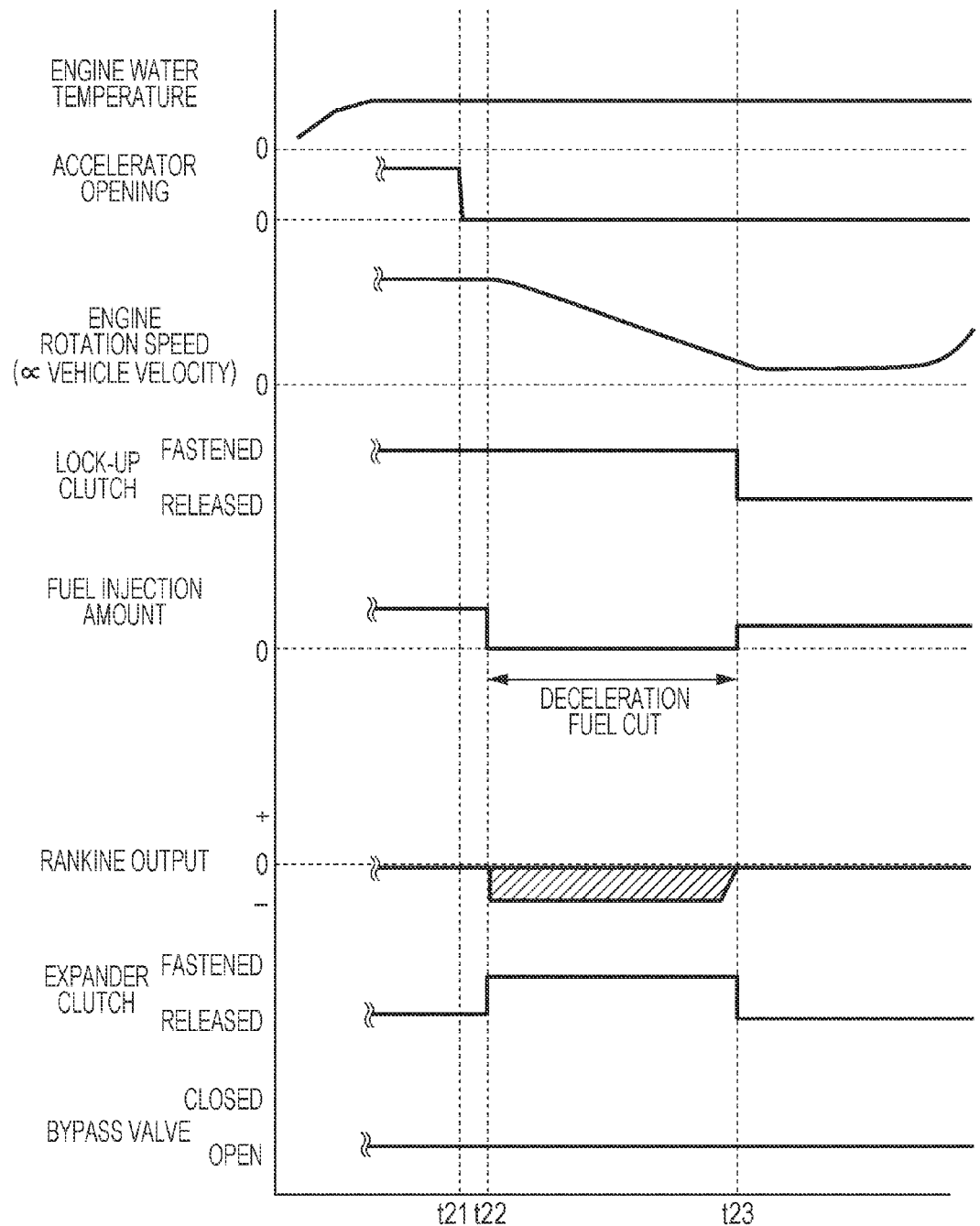

RANKINE CYCLE

TECHNICAL FIELD

This invention relates to a Rankine cycle adapted to collect waste heat of an engine for use as driving force.

BACKGROUND

A Rankine cycle includes: a refrigerant pump adapted to circulate a refrigerant; a waste heat collector adapted to collect the waste heat of an engine with the refrigerant; an expander adapted to convert the waste heat collected with the refrigerant into the driving force by expanding the refrigerant; and a condenser adapted to condense the refrigerant expanded by the expander. The driving force retrieved by the expander is transmitted to the output shaft of the engine and a power generator via belts and the like.

JP2005-313878A discloses that a refrigerant pump is driven before the operation of the expander of the Rankine cycle is initiated (hereinafter referred to as "preliminary driving"), in order to properly adjust the distribution of the refrigerant (including lubricant component) in the Rankine cycle.

SUMMARY OF INVENTION

However, according to JP2005-313878A, the preliminary driving of the refrigerant pump is conducted with use of the driving force of the engine, which may deteriorate the fuel efficiency.

The invention serves to inhibit the fuel efficiency from being deteriorated due to the preliminary driving of the refrigerant pump for eliminating uneven distribution of the refrigerant.

According to an aspect of the invention, a Rankine cycle includes: a refrigerant pump adapted to circulate a refrigerant; a heat exchanger adapted to collect waste heat of an engine with the refrigerant; an expander adapted to convert the waste heat collected with the refrigerant into driving force by expanding the refrigerant; and a condenser adapted to condense the refrigerant having been expanded by the expander. The Rankine cycle further includes a clutch provided in a power transmission path extending from the engine to the refrigerant pump. With this configuration, the Rankine cycle fastens the clutch and drives the refrigerant pump with use of vehicle inertia force, prior to an operation of the Rankine cycle and during deceleration of the vehicle.

Embodiments and advantageous effects according to the invention will be described in detail below with reference to the attached drawings.

BRIEF DESCRIPTION OF DRAWINGS

FIG. 2A is a cross sectional view schematically depicting an expander pump formed by integrating a pump and an expander together.

FIG. 9 is a timing diagram depicting a situation where Rankine operation conditions are satisfied while traveling.

FIG. 10 is a timing diagram depicting a situation where the refrigerant pump is driven to adjust the distribution of the refrigerant while the Rankine operation conditions are not satisfied.

DESCRIPTION OF EMBODIMENTS

Figure 1:
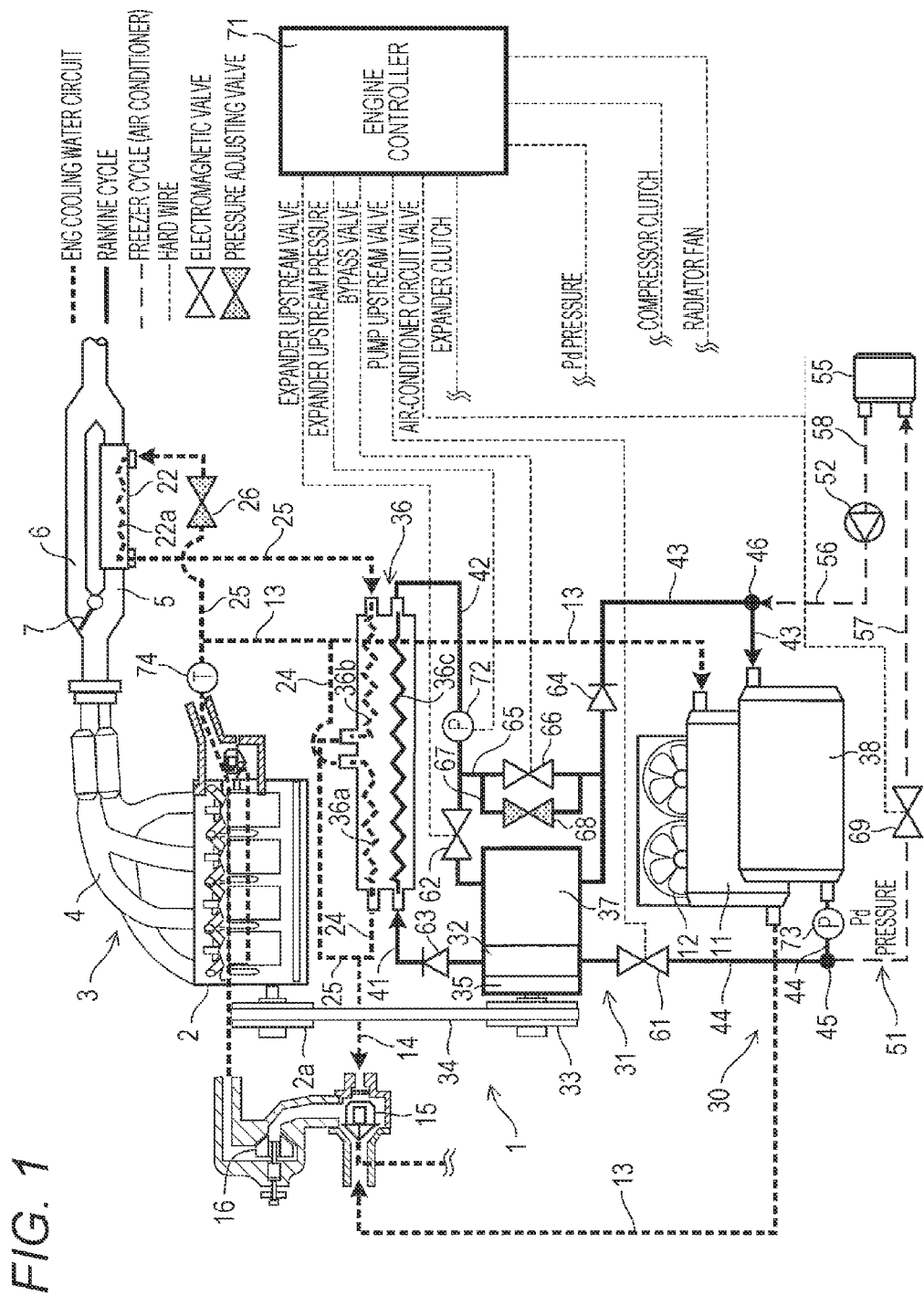
FIG. 1 schematically depicts a configuration of an integrated cycle.
Figure 4:
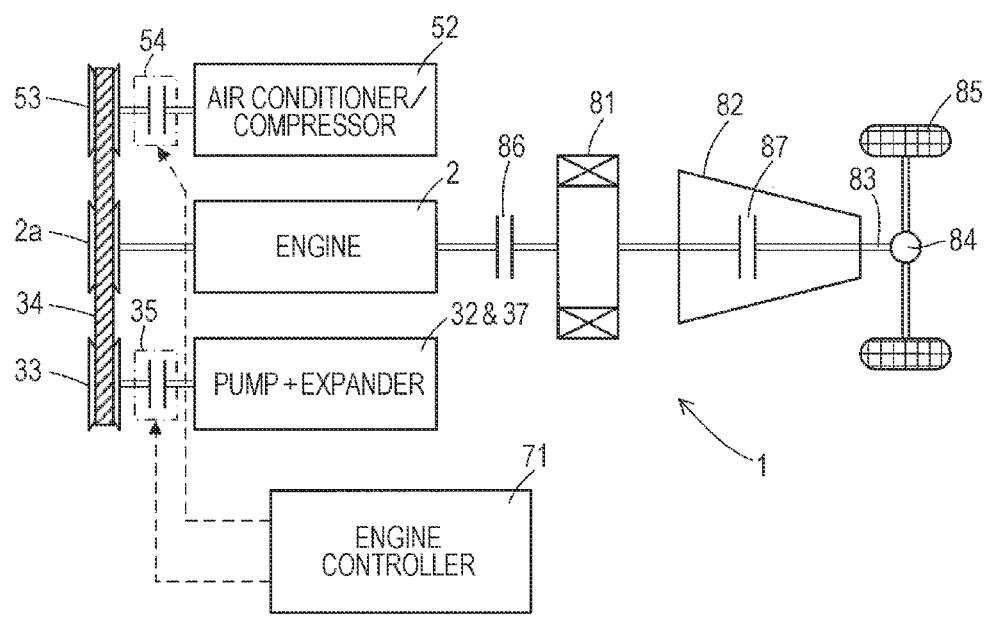
FIG. 4 schematically depicts a configuration of a hybrid vehicle.

FIG. 1 schematically depicts a configuration of the entire system of a Rankine cycle 31 upon which the invention is predicated. The Rankine cycle 31 in FIG. 1 shares a refrigerant and a condenser 38 with a freezer cycle 51. The cycle provided by the integration of the Rankine cycle 31 with the freezer cycle 51 will be hereinafter referred to as an integrated cycle 30. FIG. 4 schematically depicts a configuration of a hybrid vehicle 1 in which the integrated cycle 30 is installed. The integrated cycle 30 refers to the entire system, which includes not only circuits (passages) through which the refrigerant of the Rankine cycle 31 and the freezer cycle 51 is circulated, and pumps, expanders, condensers and other components provided to the circuits (passages), but also paths (passages) for cooling water and exhaust gas and the like.

Figure 6:
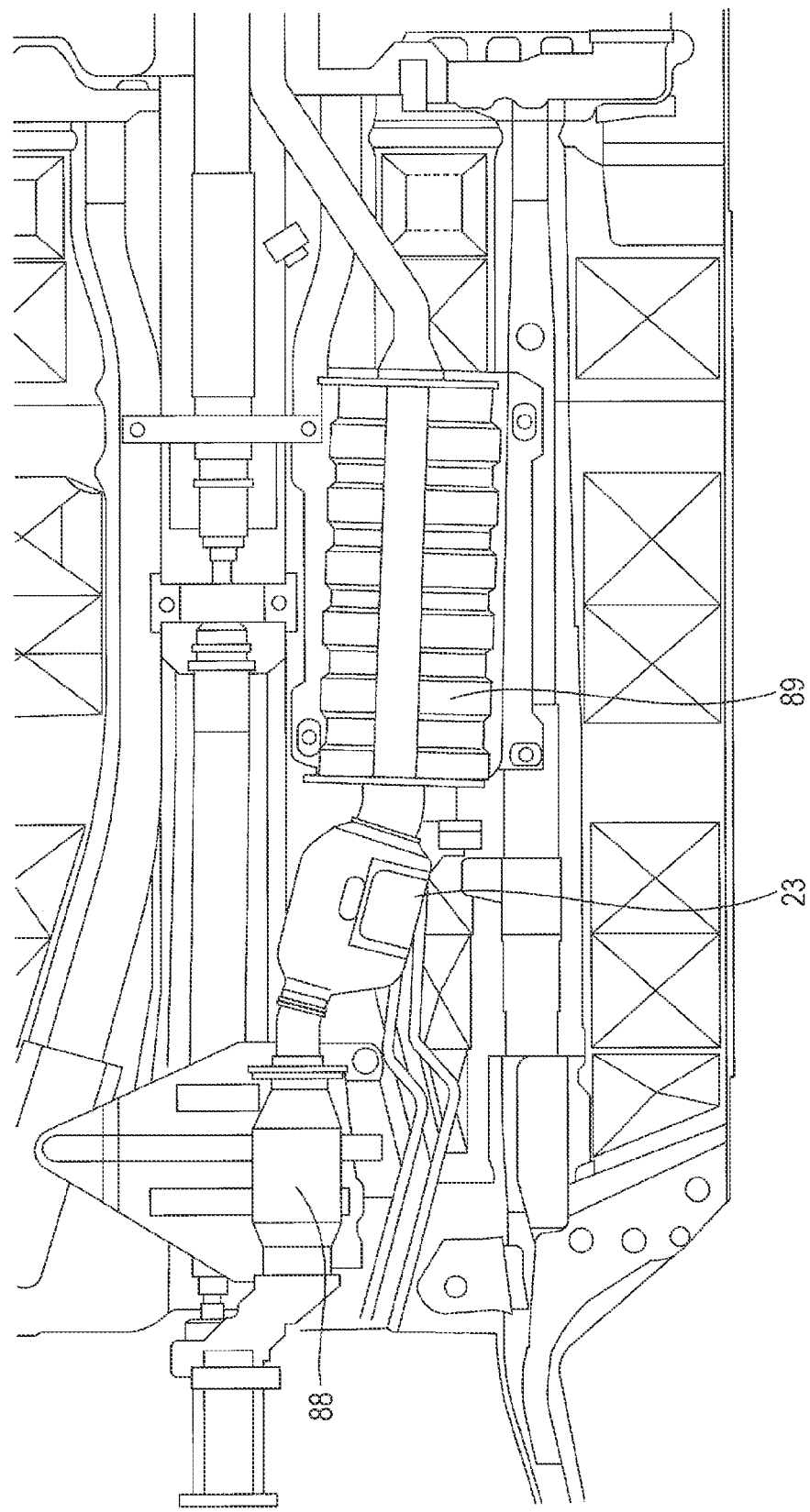
FIG. 6 schematically depicts the layout of exhaust pipes viewed from the lower side of the vehicle.

In the hybrid vehicle 1, an engine 2, a motor generator 81 and an automatic gear transmission 82 are connected together in series. The output from the automatic gear transmission 82 is transmitted to driving wheels 85 via a propeller shaft 83 and a differential gear 84. A first driving shaft clutch 86 is provided between the engine 2 and the motor generator 81. Further, a friction coupling element of the automatic gear transmission 82 is configured to serve as a second driving shaft clutch 87. The first driving shaft clutch 86 and the second driving shaft clutch 87 are connected to an engine controller 71, and the connection and disconnection (connecting condition) is controlled depending on the operation conditions of the hybrid vehicle. As depicted in FIG. 7B, when the vehicle velocity is in an EV traveling zone during which the engine 2 is not efficiently working, the hybrid vehicle 1 stops the engine 2, switches off the first driving shaft clutch 86, and switches on the connection of the second driving shaft clutch 87, so that the hybrid vehicle 1 travels only with the driving force from the motor generator 81. On the other hand, when the vehicle velocity shifts from the EV traveling zone to a Rankine cycle driving zone, the engine 2 is operated to operate the Rankine cycle 31 (described later). The engine 2 includes an exhaust path 3, and the exhaust path 3 includes an exhaust manifold 4 and an exhaust pipe 5 connected to an integrated section of the exhaust manifold 4. From the exhaust pipe 5, a bypass exhaust pipe 6 is branched. To a portion of the exhaust pipe 5 bypassed by the bypass exhaust pipe 6, a waste heat collector 22 adapted to conduct a heat exchange between the exhaust gas and the cooling water is provided. As depicted in FIG. 6, the waste heat collector 22 and the bypass exhaust pipe 6 are integrated as a waste heat collecting unit 23, and positioned between an underfloor catalyst 88 and a sub muffler 89 located at a position downstream with respect to the underfloor catalyst 88.

With reference to FIG. 1, an engine cooling water circuit will be initially described. The cooling water of approximately 80 to 90° C. ejected from the engine 2 is divided respectively into: a cooling water path 13 that passes through a radiator 11; and a bypass cooling water path 14 that bypasses the radiator 11. The divided two flows are then merged together again at a thermostat valve 15 adapted to control the flow amounts of the cooling water flowing in the paths 13 and 14, and returns to the engine 2 through a cooling water pump 16. The cooling water pump 16 is driven by the engine 2, and the rotation speed thereof is synchronized with the engine rotation speed. When the temperature of the cooling water is high, the thermostat valve 15 relatively increases the amount of the cooling water flowing through the radiator 11 by widening the valve opening for the cooling water path 13 side, and when the temperature of the cooling water is low, the thermostat valve 15 relatively decreases the amount of the cooling water flowing through the radiator 11 by narrowing the valve opening for the cooling water path 13 side. When the temperature of the cooling water is particularly low (e.g., prior to the heating of the engine 2), the radiator 11 is fully bypassed and all amount of the cooling water flows through the bypass cooling water path 14 side. On the other hand, under no circumstance is the valve opening for the bypass cooling water path 14 side completely closed. When the amount of the cooling water flowing through the radiator 11 is increased, the amount of the cooling water flowing in the bypass cooling water path 14 will be reduced as compared to where all amount of the cooling water flows through the bypass cooling water path 14 side, but the thermostat valve 15 is configured not to completely stop the flow in the bypass cooling water path 14. The bypass cooling water path 14, which bypasses the radiator 11, includes: a first bypass cooling water path 24 branched from the cooling water path 13 and directly connected to the later-described heat exchanger 36; and a second bypass cooling water path 25 branched from the cooling water path 13 and connected to the heat exchanger 36 through the waste heat collector 22.

The bypass cooling water path 14 includes the heat exchanger 36 adapted to conduct a heat exchange with the refrigerant of the Rankine cycle 31. The heat exchanger 36 is formed by integrating an evaporator and a heater together. Specifically, the heat exchanger 36 is provided with two cooling water paths 36a and 36b substantially in a liner arrangement, and a refrigerant path 36c through which the refrigerant of the Rankine cycle 31 flows adjacent to the cooling water paths 36a and 36b so that the refrigerant exchanges heat with the cooling water. The paths 36a, 36b and 36c are configured such that the refrigerant of the Rankine cycle 31 and the cooling water flow respectively in opposite directions when the heat exchanger 36 as a whole is overhead viewed.

More specifically, the first cooling water path 36a located at a position upstream side with respect to the refrigerant of the Rankine cycle 31 (i.e., left side in FIG. 1) is interposed in the first bypass cooling water path 24. The cooling water path 36a and the left portion of the heat exchanger which consists of a portion of the refrigerant path adjacent to the cooling water path 36a serve as an evaporator, and by directly introducing into the cooling water path 36a the cooling water from the engine 2, the refrigerant of the Rankine cycle 31 flowing through the refrigerant path 36c is heated.

The other cooling water path 36b located at a position downstream side with respect to the refrigerant of the Rankine cycle 31 (i.e., right side in FIG. 1) is fed with the cooling water having passed through the waste heat collector 22 by way of the second bypass cooling water path 25. The cooling water path 36b and the right portion of the heat exchanger (down stream side for the refrigerant of the Rankine cycle 31) which consists of a portion of the refrigerant path adjacent to the cooling water path 36b serve as a heater, and by introducing into the cooling water path 36b the cooling water of the outlet of the engine 2 after having been further heated with the exhaust gas, the refrigerant flowing through the refrigerant path 36c is heated.

A cooling water path 22a of the waste heat collector 22 is located closely to the exhaust pipe 5. By introducing into the cooling water path 22a of the waste heat collector 22 the cooling water of the outlet of the engine 2, the cooling water is heated with the exhaust gas of a high temperature up to, for instance, approximately 110 to 115° C. The cooling water path 22a is configured such that the exhaust gas and the cooling water respectively flow in opposite directions when the waste heat collector 22 as a whole is overhead viewed.

In the second bypass cooling water path 25 provided with the waste heat collector 22, a control valve 26 is interposed. When a cooling water temperature sensor 74 at the outlet of the engine 2 detects a temperature of a predetermined value or higher, the opening of the control valve 26 is reduced so that the engine water temperature which is indicative of the temperature of the cooling water within the engine 2 does not exceed a tolerant temperature (e.g., 100° C.) so as to prevent, for instance, the efficiency deterioration or knocking of the engine 2. When the engine water temperature approximates to the tolerant temperature, the amount of the cooling water passing through the waste heat collector 22 is reduced, and thus, the engine water temperature is reliably prevented from exceeding the tolerant temperature.

On the other hand, if the cooling water is excessively heated by the waste heat collector 22 and evaporated (boiled) due to the reduction in the flow rate in the second bypass cooling water path 25, the cooling water may not smoothly flow through the cooling path, and the temperature of the components may be excessively increased. For the avoidance of such problem, the configuration includes: the bypass exhaust pipe 6 bypassing the waste heat collector 22; and a thermostat valve 7 adapted to control the amount of the exhaust gas through the waste heat collector 22 and the amount of the exhaust gas through the bypass exhaust pipe 6 and positioned at the position where the bypass exhaust pipe 6 is branched. Specifically, the valve opening of the thermostat valve 7 is adjusted based on the temperature of the cooling water ejected from the waste heat collector 22 so that the temperature of the cooling water ejected from the waste heat collector 22 does not exceed a predetermined temperature (e.g., boiling temperature of 120° C.).

The heat exchanger 36, the thermostat valve 7 and the waste heat collector 22 are integrated as the waste heat collecting unit 23, and provided to the exhaust pipe under the floor at substantially the middle position in the vehicle width direction. The thermostat valve 7 may be a temperature sensitive valve relatively simply configured with use of bimetal and the like, or may be a control valve controlled by a controller inputted with an output of a temperature sensor. The adjustment of the amount of the heat exchange from the exhaust gas to the cooling water by the thermostat valve 7 accompanies a relatively long delay. Thus, it is difficult to control the engine water temperature not to exceed the tolerant temperature, by merely adjusting the thermostat valve 7 only. However, the control valve 26 of the second bypass cooling water path 25 is controlled based on the engine water temperature (outlet temperature). Thus, the heat collection amount is able to reduce rapidly, and the engine water temperature is reliably prevented from exceeding the tolerant temperature. Further, when there is a leeway for the engine water temperature to reach the tolerant temperature, the amount of the waste heat collection may be increased by continuing the heat exchange until the temperature of the cooling water ejected from the waste heat collector 22 reaches such a high temperature as to exceed the tolerant temperature of the engine water temperature (e.g., 110 to 115° C.). The cooling water ejected from the cooling water path 36b flows into the first bypass cooling water path 24 to join through the second bypass cooling water path 25.

When the cooling water heading to the thermostat valve 15 from the bypass cooling water path 14 exhibits a sufficiently low temperature due to, for instance, a heat exchange with the refrigerant of the Rankine cycle 31 at the heat exchanger 36, the valve opening of the thermostat valve 15 for the cooling water path 13 is reduced, and the amount of the cooling water passing through the radiator 11 is relatively reduced. On the other hand, when the cooling water heading to the thermostat valve 15 from the bypass cooling water path 14 exhibits a high temperature due to, for instance, the non-operation of the Rankine cycle 31, the valve opening of the thermostat valve 15 for the cooling water path 13 is increased, and the amount of the cooling water passing through the radiator 11 is relatively increased. With the above-described operations of the thermostat valve 15, the configuration is formed such that the cooling water of the engine 2 maintains its temperature properly, and the heat is properly fed to (collected by) the Rankine cycle 31.

In the next description, the Rankine cycle 31 will be described. Herein, the Rankine cycle 31 is not a simple Rankine cycle, but forms a part of the integrated cycle 30 integrated with the freezer cycle 51. In the description made below, the Rankine cycle 31, which forms the basics, will be first described, and then the freezer cycle 51 will be referred to.

The Rankine cycle 31 is a system adapted to collect the waste heat of the engine 2 with the refrigerant via the cooling water of the engine 2, and to regenerate the driving force from the collected waste heat. The Rankine cycle 31 includes a refrigerant pump 32, the heat exchanger 36 serving as a superheater, an expander 37 and a condenser 38, and each component is connected by refrigerant paths 41 to 44 in which the refrigerant (e.g., R134a and the like) is circulated.

Figure 2B:
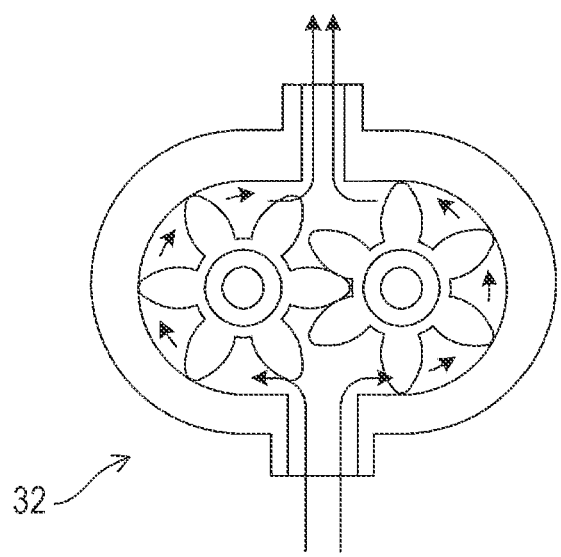
FIG. 2B is a cross sectional view schematically depicting a refrigerant pump.
Figure 2C:
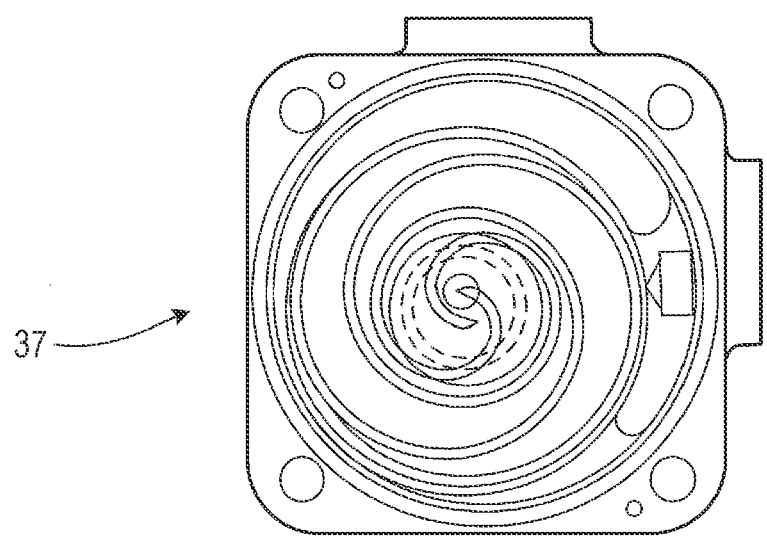
FIG. 2C is a cross sectional view schematically depicting an expander.

The shaft of the refrigerant pump 32, which is configured to coaxially link to the output shaft of the expander 37, drive the refrigerant pump 32 with use of the output power (driving force) generated by the expander 37, and feed the generated driving force to the output shaft (crank shaft) of the engine 2 (see FIG. 2A). More specifically, the shaft of the refrigerant pump 32 and the output shaft of the expander 37 are disposed in parallel to the output shaft of the engine 2, and a belt 34 is wound between; a pump pulley 33 provided at a distal end of the shaft of the refrigerant pump 32; and a crank pulley 2a (see FIG. 1). The present embodiment employs a gear pump as the refrigerant pump 32, and a scroll expander as the expander 37 (see FIGS. 2B and 2C).

Between the pump pulley 33 and the refrigerant pump 32, an electromagnetic clutch (hereinafter referred to as "expander clutch") 35 (first clutch) is provided so as to switch on and off the connection of the refrigerant pump 32 and the expander 37 with the engine 2 (see FIG. 2A). Therefore, when the output generated by the expander 37 exceeds the driving force of the refrigerant pump 32 and the friction exhibited by a rotary body (when the expected expander torque is positive), the connection of the expander clutch 35 assists the rotation of the output shaft of the engine with use of the output generated by the expander 37. As described above, the energy obtained from the waste heat collection assists the rotation of the output shaft of the engine, and thus the fuel efficiency is enhanced. Further, the energy required for driving the refrigerant pump 32 adapted to circulate the refrigerant is also covered by the collected waste heat. The expander clutch 35 may be positioned at any position as long as the expander clutch 35 is provided to a power transmission path extending from the engine 2 to the refrigerant pump 32 and the expander 37.

The refrigerant from the refrigerant pump 32 is fed to the heat exchanger 36 via the refrigerant path 41. The heat exchanger 36 conducts a heat exchange between the cooling water of the engine 2 and the refrigerant, so that the refrigerant is gasified and superheated.

The refrigerant from the heat exchanger 36 is fed to the expander 37 via the refrigerant path 42. The expander 37 is a steam turbine adapted to convert the heat into rotation energy by expanding the gasified and heated refrigerant. The driving force collected by the expander 37 drives the refrigerant pump 32, and is transmitted to the engine 2 via a belt transmission mechanism, to assist the rotation of the engine 2.

The refrigerant from the expander 37 is fed to the condenser 38 through the refrigerant path 43. The condenser 38 is a heat exchanger adapted to conduct a heat exchange between the outer air and the refrigerant, so that the refrigerant is cooled and liquefied. Accordingly, the condenser 38 is disposed in juxtaposition with the radiator 11, and the cooling is conducted by a radiator fan 12.

The refrigerant liquefied by the condenser 38 is returned to the refrigerant pump 32 via the refrigerant path 44. The refrigerant having returned to the refrigerant pump 32 is delivered again to the heat exchanger 36 by the refrigerant pump 32, and circulated in each component of the Rankine cycle 31.

In the next description, the freezer cycle 51 will be described. The freezer cycle 51, which is adapted to share the refrigerant circulated in the Rankine cycle 31 and integrated with the Rankine cycle 31, is simply configured. Specifically, the freezer cycle 51 includes a compressor 52, the condenser 38 and an evaporator 55.

The compressor 52 is a fluid machinery adapted to compress the refrigerant of the freezer cycle 51 to exhibit high temperature and high pressure, and driven by the engine 2. Specifically, also as depicted in FIG. 4, a driving shaft of the compressor 52 is fixed with a compressor pulley 53, and the belt 34 is wound between the compressor pulley 53 and the crank pulley 2a. The driving force of the engine 2 is transmitted to the compressor pulley 53 via the belt 34, and the compressor 52 is driven. Further, between the compressor pulley 53 and the compressor 52, an electromagnetic clutch (hereinafter referred to as "compressor clutch") 54 (second clutch) is provided so as to switch on and off the connection of the compressor 52 with the compressor pulley 53.

Referring back to FIG. 1, the refrigerant from the compressor 52 merges into the refrigerant path 43 via the refrigerant path 56, and is thereafter fed to the condenser 38. The condenser 38 is a heat exchanger adapted to condense and liquefy the refrigerant by heat exchange with the outer air. The liquid refrigerant from the condenser 38 is fed to the evaporator 55 via the refrigerant path 57 branched from the refrigerant path 44. Like a heater core (not depicted), the evaporator 55 is disposed within a case of an air conditioning unit. The evaporator 55 is a heat exchanger adapted to evaporate the liquid refrigerant from the condenser 38 and cool the conditioned air from a blower fan with use of the evaporative latent heat generated at that time.

The refrigerant evaporated through the evaporator 55 is returned to the compressor 52 through the refrigerant path 58. The mixing ratio of the conditioned air cooled by the evaporator 55 and the conditioned air heated by the heater core is changed depending on the opening of an air mixing door, so that the temperature of the air is adjusted to the temperature set by a passenger.

The integrated cycle 30, which includes the Rankine cycle 31 and the freezer cycle 51, is appropriately provided with, in the middle of the circuit, a variety of valves adapted to control the refrigerant flowing in the cycle. In order to control the refrigerant circulated in the Rankine cycle 31, for instance, a pump upstream valve 61 is provided to the refrigerant path 44 communicating a freezer cycle diverging point 45 with the refrigerant pump 32 and an expander upstream valve 62 is provided to the refrigerant path 42 communicating the heat exchanger 36 with the expander 37. The refrigerant path 41 communicating the refrigerant pump 32 with the heat exchanger 36 is provided with a check valve 63 adapted to prevent the backward flow of the refrigerant from the heat exchanger 36 to the refrigerant pump 32. The refrigerant path 43 communicating the expander 37 with the freezer cycle diverging point 46 is also provided with a check valve 64 adapted to prevent the backward flow of the refrigerant from the freezer cycle diverging point 46 to the expander 37. An expander bypass path 65 extending from a position upstream with respect to the expander upstream valve 62 to merge into the upstream of the check valve 64 while bypassing the expander 37 is further provided, and the expander bypass path 65 includes a bypass valve 66. Further, a path 67 bypassing the bypass valve 66 is provided with a pressure adjusting valve 68. In the freezer cycle 51 as well, the refrigerant path 57 connecting the freezer cycle diverging point 45 with the evaporator 55 is provided with an air conditioner circuit valve 69.

The four valves 61, 62, 66 and 69 described above are all electromagnetic on-off valves. The engine controller 71 is inputted with: a signal of the expander upstream pressure detected by a pressure sensor 72; a signal of a refrigerant pressure Pd at the outlet of the condenser 38 detected by a pressure sensor 73; a signal of rotation speed of the expander 37; and the like. Depending on the predetermined operation conditions, the engine controller 71 controls the compressor 52 of the freezer cycle 51 and the radiator fan 12 based on each of these imputed signals, and controls the switching on and of the above four electromagnetic on-off valves 61, 62, 66 and 69.

For instance, an expander torque (regenerated driving force) is estimated based on the expander upstream pressure detected by the pressure sensor 72 ad the expander rotation speed, and the expander clutch 35 is fastened when the estimated expander torque is positive (i.e., when the rotation of the engine output shaft is able to be assisted) and when the estimated expander torque is zero or negative, the expander clutch 35 is released. Since the expander torque is estimated based on the pressure detected by a sensor and the rotation speed of the expander, the estimate of the expander torque (regenerated driving force) becomes more accurate as compared to a configuration where the expander torque is estimated based on the temperature of the exhaust gas. Therefore, the expander clutch 35 is properly fastened and released depending on the occurrence conditions of the expander torque (for the details, see JP-A-2010-190185).

The above four on-off valves 61, 62, 66 and 69 and the two check valves 63 and 64 are refrigerant system valves. Functions of these refrigerant system valves are depicted in FIG. 3.

Figure 3:
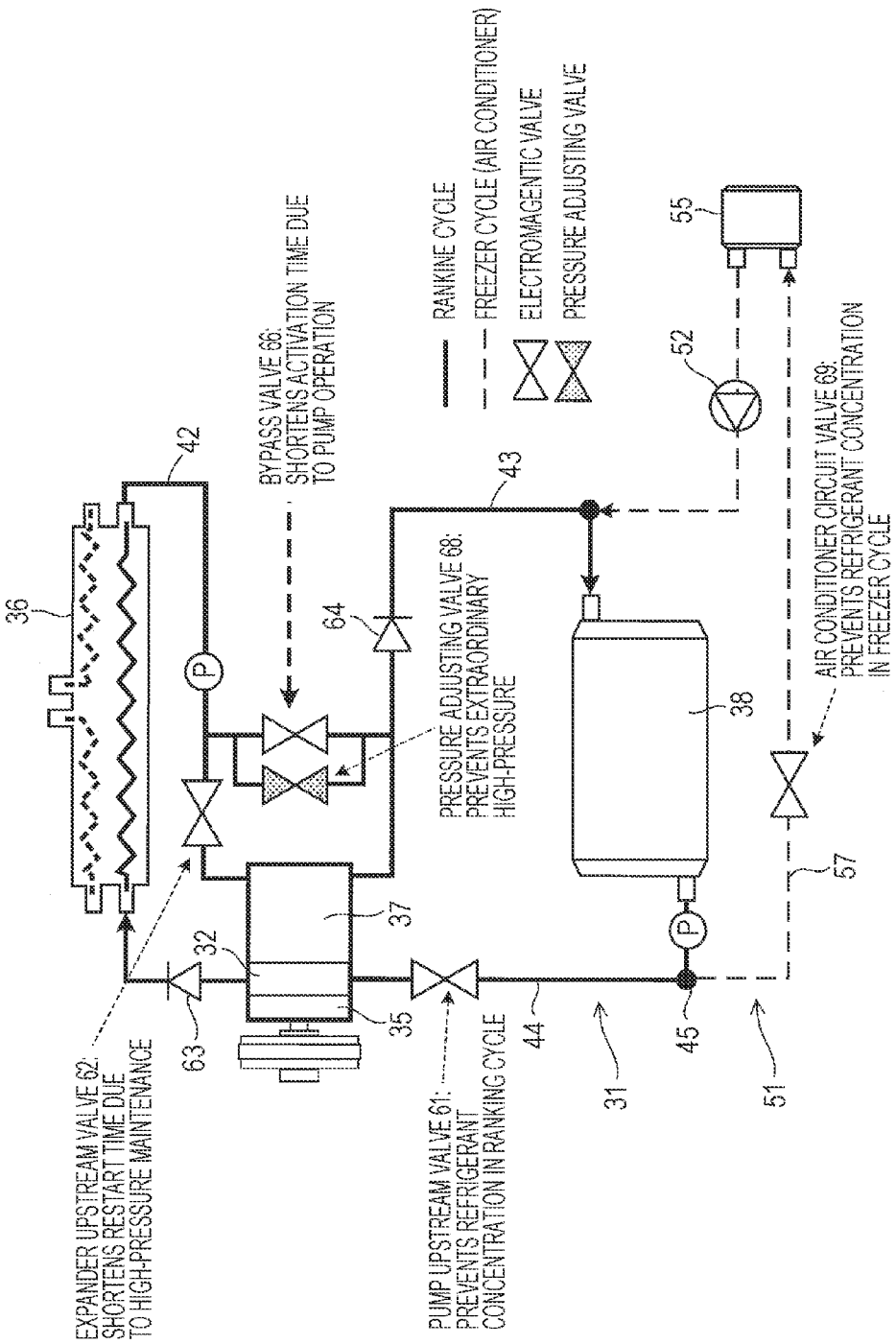
FIG. 3 schematically depicts functions of a refrigerant system valve.

In FIG. 3, in order to prevent the refrigerant (including the lubricant component) from being unevenly distributed to the Rankine cycle 31, the pump upstream valve 61 is closed under a predetermined condition where the refrigerant tends to be more distributed to the circuits of the Rankine cycle 31 than to the circuits of the freezer cycle 51. As will be described below, in cooperation with the check valve 64 located at a position downstream with respect to the expander 37, the pump upstream valve 61 closes the circuits of the Rankine cycle 31. The expander upstream valve 62 is adapted to block the refrigerant path 42 when the pressure of the refrigerant from the heat exchanger 36 is relatively low, so that the refrigerant from the heat exchanger 36 is retained until the refrigerant become high pressure. By this operation, even when the expander torque is not sufficiently obtained, the refrigerant is heated at an accelerated pace, and for instance, the time required for restarting the Rankine cycle 31 (the time required for the regeneration to actually start) is shortened. When the amount of the refrigerant is not sufficiently present on the side of the Rankine cycle 31 at the time of starting the Rankine cycle 31, the bypass valve 66 opens such that the refrigerant pump 32 is operated while the expander 37 is bypassed, and shortens the time required for restarting the Rankine cycle 31. By operating the refrigerant pump 32 while the expander 37 is bypassed, the Rankine cycle 31 is ready to be sufficiently fed with liquid refrigerant, as long as the temperature of the refrigerant at the outlet of the condenser 38 or at the inlet of the refrigerant pump 32 is reduced to be lower by a predetermined temperature amount or more (subcool temperature SC) than the boiling point taking account of the pressure at that point.

The check valve 63 located at a position upstream with respect to the heat exchanger 36 is adapted to maintain the refrigerant fed to the expander 37 to exhibit a high pressure, in cooperation with the bypass valve 66, the pressure adjusting valve 68 and the expander upstream valve 62. Under the conditions where the regeneration at the Rankine cycle is conducted at low efficiency, the operation of the Rankine cycle is stopped, and the circuits extending before and after the heat exchanger are closed. By this operation, the pressure of the refrigerant during the stoppage is increased, and the Rankine cycle is rapidly restarted with use of the high pressure refrigerant. The pressure adjusting valve 68 serves as a relief valve. When the pressure of the refrigerant to be fed to the expander 37 becomes excessively high, the pressure adjusting valve 68 opens to release the refrigerant whose pressure has been excessively increased.

The check valve 64 located at a position downstream with respect to the expander 37 prevents the refrigerant from being unevenly distributed to the Rankine cycle 31, in cooperation with the above-described pump upstream valve 61. Immediately after the initiation of the operation of the hybrid vehicle 1, when the engine 2 is not warmed up yet, the Rankine cycle 31 may exhibit a lower temperature than the freezer cycle 51, and the refrigerant may be more distributed to the Rankine cycle 31 side. Although the probability for such uneven distribution to the Rankine cycle 31 side is not very high, there is a demand for more securing the refrigerant for the freezer cycle 51 by canceling even a small uneven distribution of the refrigerant. Such demand is present, for instance, immediately after the initiation of the operation of the vehicle in a summer time, where the cooling of the vehicle's interior soon is required and the cooling performance is most demanded. Thus, in order to prevent the uneven distribution of the refrigerant to the Rankine cycle 31 side, the check valve 64 is provided.

The compressor 52 is not configured such that the refrigerant freely passes therethrough at the time of the operation stoppage. The compressor 52 prevents the uneven distribution of the refrigerant to the freezer cycle 51 in cooperation with the air conditioner circuit valve 69. This will be described below. When the operation of the freezer cycle 51 is stopped, the refrigerant may move from the Rankine cycle 31 side (i.e., the cycle constantly operated and exhibiting relatively high temperature ) to the freezer cycle 51, thereby causing a shortage of the refrigerant to be circulated in the Rankine cycle 31. In the freezer cycle 51, immediately after the stoppage of the cooler, the temperature of the evaporator 55 is low. Thus, the refrigerant tends to be accumulated in the evaporator 55, which exhibits relatively large volume and low temperature. At this time, not only by blocking the movement of the refrigerant from the condenser 38 to the evaporator 55 due to the operation stoppage of the compressor 52, but also by closing the air conditioner circuit valve 69, the uneven distribution of the refrigerant to the freezer cycle 51 is prevented.

Figure 5:
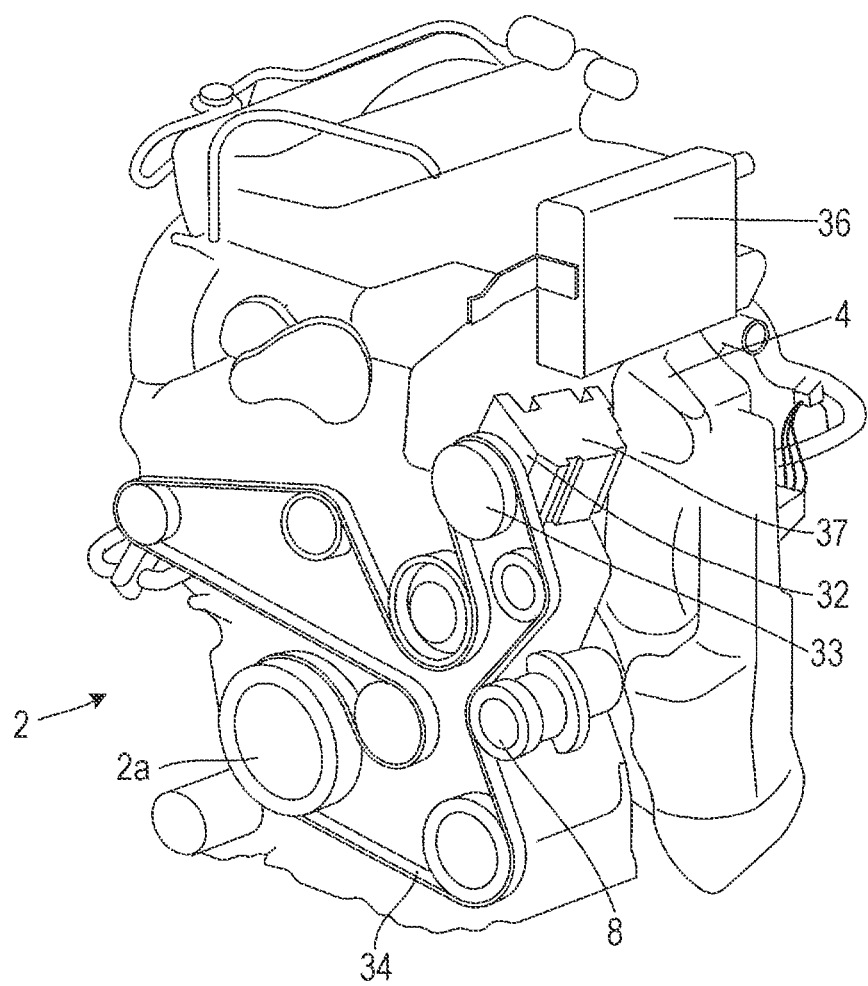
FIG. 5 is perspective view schematically depicting an engine.

Next, FIG. 5 is a perspective view schematically depicting the engine 2, where a package of the entire engine 2 is depicted. What is distinctive in FIG. 5 is that the heat exchanger 36 is positioned at a position vertically upside with respect to the exhaust manifold 4. By placing the heat exchanger 36 at a space located at a vertically upper side of the exhaust manifold 4, the mountability of the Rankine cycle 31 to the engine 2 is enhanced. Further, the engine 2 is provided with a tension pulley 8.

In the next description, the basic operation methods of the Rankine cycle 31 will be described with reference to FIGS. 7A and 7B.

Figure 7A:
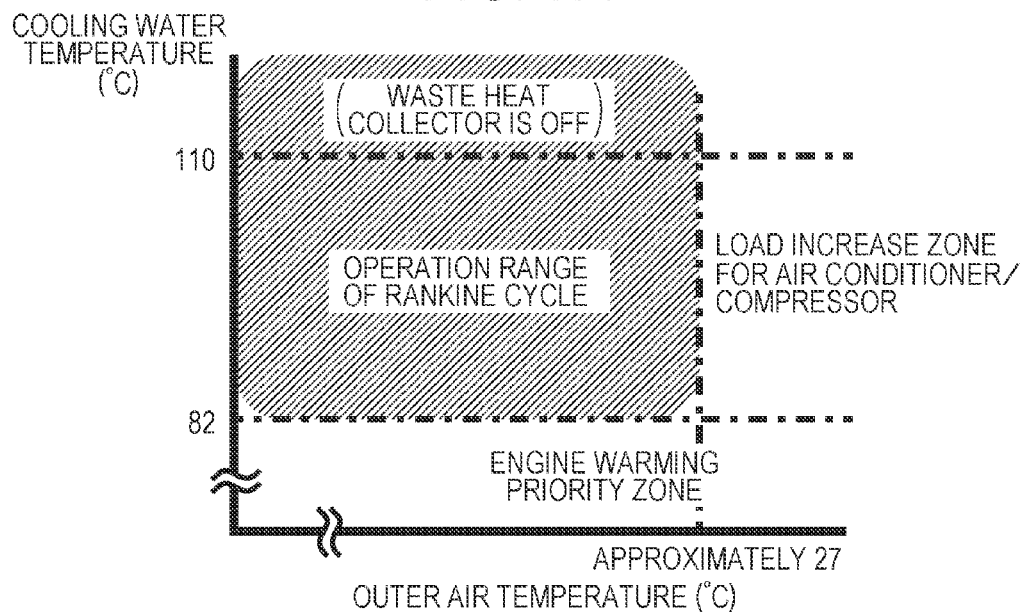
FIG. 7A is a map depicting an operation range of the Rankine cycle.
Figure 7B:
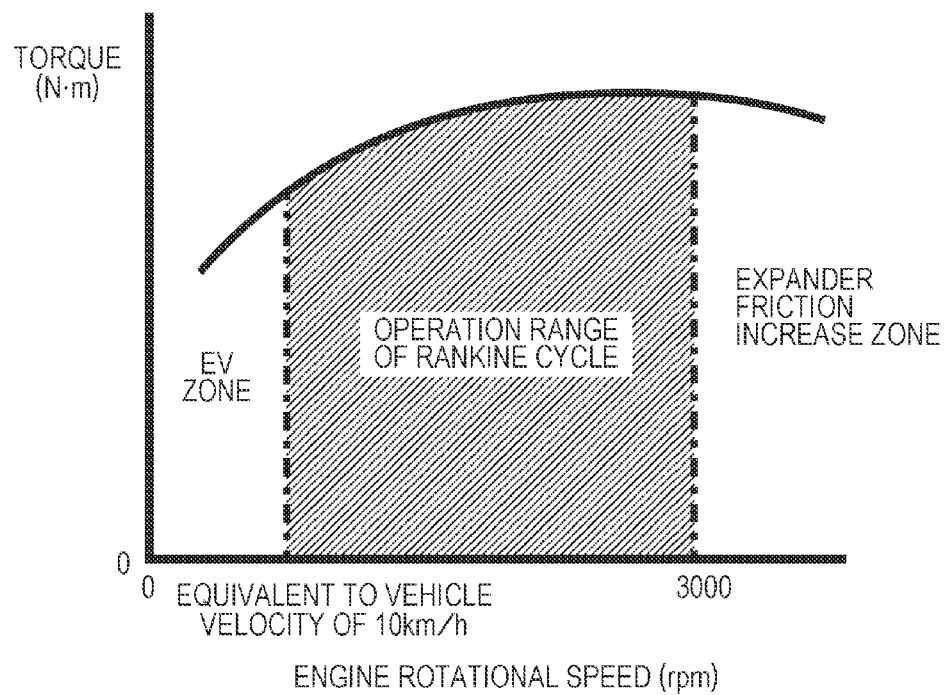
FIG. 7B is a map depicting an operation range of the Rankine cycle.

First of all, FIGS. 7A and 7B depict an operation range of the Rankine cycle 31. FIG. 7A depicts an operation range of the Rankine cycle 31 with the horizontal axis representing the outer air temperature and the vertical axis representing the engine water temperature (cooling water temperature). FIG. 7B depicts an operation range of the Rankine cycle 31 with the horizontal axis representing the engine rotation speed and the vertical axis representing the engine torque (engine load).

When a predetermined condition is satisfied in both of FIGS. 7A and 7B, the Rankine cycle 31 is operated. When the conditions under both FIGS. 7A and 7B are satisfied, the Rankine cycle 31 is operated. In FIG. 7A, the operation of the Rankine cycle 31 is stopped in a low water-temperature side region where the heating of the engine 2 is prioritized, and in a high outer air temperature side region where the load on the compressor 52 is increased. While the engine is heated (i.e., when the exhaust gas exhibits low temperature and the collection efficiently is low), the Rankine cycle 31 is not operated, thereby promptly increasing the temperature of the cooling water. When the outer air temperature is high and high cooling performance is demanded, the Rankine cycle 31 is stopped, so that the freezer cycle 51 is provided sufficiently with the refrigerant and high cooling performance by the condenser 38. In FIG. 7B, in terms of the hybrid vehicle, the operation of the Rankine cycle 31 is stopped in the EV traveling zone, and in the high rotation speed zone side where the friction of the expander 37 is increased. It is difficult to configure the expander 37 to have such high efficiency that low friction is exhibited for every rotation speed. Thus, in FIG. 7B, the expander 37 is configured (dimension and the like of each component of the expander 37 is set) such that the friction is reduced and high efficiency is exhibited in the frequently-used range of the engine rotation speed.

The refrigerant moves within the cycle due to the changes in the temperature of the components, no matter whether during the operation or the non-operation. In this manner, the uneven distribution of the lubricating oil is locally generated. In the integrated cycle 30 of this embodiment, the pump upstream valve 61 and the check valve 64 are provided in order to prevent the uneven distribution of the refrigerant (including the lubricant component) in the non-operating Rankine cycle 31 (see FIG. 3), but the arrangement does not completely prevent the uneven distribution of the refrigerant generated during the non-operation of the Rankine cycle 31. The distribution of the refrigerant during the non-operation may be affected by the distribution of the refrigerant during the non-driving (i.e., key off). Further, in the closure sections between the valves, the uneven distribution of the refrigerant may be locally generated. When the refrigerant is unevenly distributed, the interior (circuits) of the Rankine cycle 31 as a whole may not be sufficiently fed with the lubricant component, and lubrication of the rotating portions or the like may be damaged, and function reliability may be affected. Accordingly, in the transition from the key off to key on, the refrigerant is desirably circulated to spread in the entire interior of the Rankine cycle 31 to secure the lubricating capabilities. Further, in order to operate the Rankine cycle 31, it is important that the liquid refrigerant is sufficiently prepared or fed (present) at the inlet of the refrigerant pump 32 at the initiation of the operation. Not only when the Rankine cycle 31 is started for the first time after the key on, but also when the operation of the Rankine cycle 31 is temporarily stopped depending on the operation conditions of the engine 2 (i.e., operation stoppage and the operation resumption are repeated during the key on), the liquid refrigerant at the inlet of the refrigerant pump 32 may become insufficient.

Thus, in this embodiment, when the operation of the Rankine cycle 31 is started, a preliminary driving control of the refrigerant pump as described below is conducted prior to the start of the operation, so that the uneven distribution of the refrigerant in the Rankine cycle 31 is eliminated and the shortage of the refrigerant at the inlet of the refrigerant pump 32 is compensated. Specifically, at least one time after the key on, the distribution is adjusted so that the refrigerant is sufficiently fed to the entire interior of the Rankine cycle 31. In addition, every time the operation of the Rankine cycle 31 is started, a refrigerant preparation is conducted so that the liquid refrigerant is sufficiently present at the inlet of the refrigerant pump 32. The difference between the refrigerant preparation and the distribution adjustment is in, for instance, the strength of the preliminary driving of the refrigerant pump. In the refrigerant preparation, the preliminary driving of the refrigerant pump is conducted for a longer time than in the distribution adjustment. Also in the refrigerant preparation, the preliminary driving of the refrigerant pump 32 needs to be basically a continuous driving. On the other hand, in the distribution adjustment, whether or not the preliminary driving is a continuous driving does not matter very much. However, since the difference between the refrigerant preparation and the distribution adjustment may be affected due to the operation conditions, for instance, the time of the preliminary driving may be on a relationship opposite to the above.

The distribution adjustment, which is for making up for the shortage of the lubrication due to being left for a long time, will be sufficient if conducted at least one time after key on. Even if the operation of the Rankine cycle is thereafter temporarily stopped during the key on, there is no concern for the shortage of the Lubrication in principle. On the other hand, the refrigerant preparation is a preliminary processing at the starting of the operation conducted prior to starting the operation of the Rankine cycle so that the liquid refrigerant is continuously supplied to the inlet of the refrigerant pump 32 (i.e., the supply of the liquid refrigerant is not interrupted by the gasification of the refrigerant) during the operation of the Rankine cycle 31. When the Rankine cycle 31 is stopped, the conditions at the inlet of the refrigerant pump 32 are rapidly changed (i.e., the condition is no longer a condition where the continuous supply of the liquid refrigerant is possible). Thus, the refrigerant preparation is conducted every time the Rankine cycle is started to operate. The "condition where the continuous supply of the liquid refrigerant to the inlet of the refrigerant pump 32 is possible" means a condition where the refrigerant of a predetermined condition required for operating the Rankine cycle 31 is present at the inlet of the refrigerant pump 32. More specifically, the condition refers to a condition where a decrement in temperature (the subcool degree) of the inlet of the refrigerant pump 32 (or the outlet of the condenser 38) from the boiling point taking account of the pressure at the field is a predetermined amount or more. For that purpose, the liquid refrigerant needs to he sufficiently prepared and fed to (present) the inlet of the refrigerant pump 32 at the time of initiating the operation.

In terms of the positioning in the control, the preliminary driving control of the refrigerant pump roughly includes: a first distribution adjustment; a refrigerant preparation; and a second distribution adjustment, the summary for each of which is as described below.

(a) Summary of First Distribution Adjustment

When the conditions for operating the Rankine cycle 31 (hereinafter referred to as "Rankine operation conditions") are met and the refrigerant distribution needs to be adjusted, the expander clutch 35 is fastened and the refrigerant pump 32 is driven with use of the output of the engine 2, and the bypass valve 66 is opened. By this operation, the refrigerant of the Rankine cycle 31 is circulated, and the uneven distribution of the refrigerant in the Rankine cycle 31 is eliminated. The bypass valve 66 is opened for the refrigerant to bypass the expander 37 and to thereby reduce the path resistance.

The "when the refrigerant distribution needs to be adjusted" refers to when the Rankine cycle 31 is not operated even for one time during one trip (i.e., during a period from key on to key off), or to when the accumulated time during which the distribution adjustment (including the first distribution adjustment and the second distribution adjustment) is conducted is less than the time necessary for eliminating the uneven distribution of the refrigerant (hereinafter referred to as "distribution adjustment completion time"). In such instance, the refrigerant is deemed to be still unevenly distributed in the internal circuits of the Rankine cycle 31, and the lubrication shortage is deemed not to have been compensated. The distribution adjustment may be included in a part of the refrigerant preparation for sufficiently feeding the liquid refrigerant to the inlet of the refrigerant pump 32.

(b) Summary of Refrigerant Preparation

When the Rankine operation conditions are met and the adjustment of the refrigerant distribution is not required, the expander clutch 35 is fastened and the bypass valve 66 is opened during the deceleration fuel cut. Then, the refrigerant pump 32 is driven by the vehicle inertia force at the time of the deceleration, and the refrigerant (in the form of liquid) is sufficiently prepared at the inlet of the refrigerant pump 32.

However, when the deceleration fuel cut is not conducted after a while after the Rankine operation conditions are met, with an increase in the impact of the deterioration of the fuel efficiency due to the non-operation of the Rankine cycle 31, the expander clutch 35 is fastened and the refrigerant pump 32 is driven by the driving force of the engine 2. By this way, the refrigerant is sufficiently prepared at the inlet of the refrigerant pump 32, and the Rankine cycle 31 is started to be operated on completion of the preparation.

When the deceleration fuel cut is terminated before the refrigerant is sufficiently prepared at the inlet of the refrigerant pump 32, the driving of the refrigerant pump 32 is continued with use of the output of the engine 2, so that the refrigerant is reliably prepared at the inlet of the refrigerant pump 32. The refrigerant preparation may also serve as the distribution adjustment for eliminating the uneven distribution of the refrigerant in the Rankine cycle 31 and for compensating the lubrication shortage.

(c) Summary of Second Distribution Adjustment

When the Rankine operation conditions are not met and the distribution of the refrigerant needs to be adjusted, the expander clutch 35 is fastened and the bypass valve 66 is opened during the deceleration fuel cut of the engine 2, and the refrigerant pump 32 is driven with use of the vehicle inertia force at the time of the deceleration. By this operation, the refrigerant of the Rankine cycle 31 is circulated, and the uneven distribution of the refrigerant is eliminated.

However, when the deceleration fuel cut is terminated prior to the elimination of the refrigerant uneven distribution, the expander clutch 35 is released, and the processing is terminated.

Figure 8:
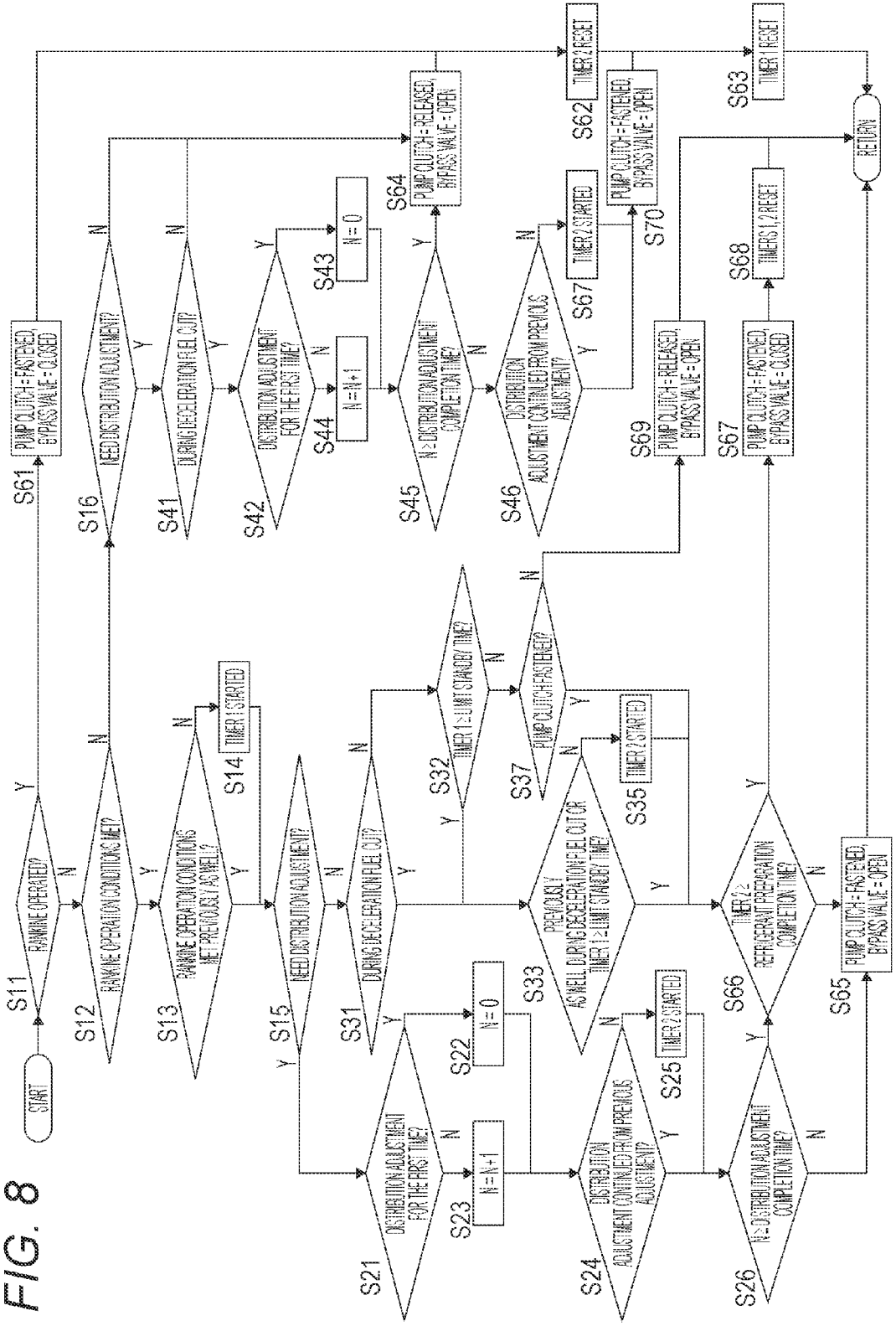
FIG. 8 is a flowchart depicting the preliminary driving control of the refrigerant pump.

FIG. 8 is a flowchart depicting the preliminary driving control of the refrigerant pump described above. With reference to the flowchart, the details of the preliminary driving control of the refrigerant pump will be described.

During the steps S11 to S16, the engine controller 71 determines whether or not the Rankine cycle 31 is in operation (already started to operate) (step S11), whether or not the Rankine operation conditions are met (step S12), and whether or not the refrigerant distribution needs to be adjusted (the uneven distribution of the refrigerant is present) (steps S15 and S16).

When the Rankine operation conditions are not met previously and the conditions are met this time for the first time, the engine controller 71 controls a timer 1 to start measuring the time lapsed after the Rankine operation conditions are met (steps S13 and S14). The timer 1 is adapted to measure how much time has elapsed while, in spite of the satisfaction of the Rankine operation conditions, the deceleration fuel cut is not conducted and the Rankine cycle 31 is actually not in operation.

Whether or not the Rankine operation conditions are met is determined with reference to the maps depicted in FIGS. 7A and 7B. When an operation point determined by the outer air temperature and the cooling water temperature and an operation point determined by the rotation speed and the torque are both in the operation range of the Rankine cycle, it is determined that the Rankine operation conditions are met.

When the Rankine cycle is in operation, the engine controller 71 fastens the expander clutch 35 and drives the refrigerant pump 32 with use of the driving force of the engine 2, and maintains the Rankine operation status during which the refrigerant is delivered to the expander 37 side with the bypass valve 66 closed (step S61) and resets the timer 1 and a timer 2 (steps S62 and S63).

The timer 2 is adapted to measure, in the first refrigerant distribution adjustment, the refrigerant preparation and the second refrigerant distribution adjustment, the time elapsed after the refrigerant pump 32 is started to be driven with the expander clutch 35 fastened. The timer 2 is used for determining whether or not the time of the preliminary driving of the refrigerant pump has reached the refrigerant preparation completion time sufficient for feeding and providing the sufficient liquid refrigerant to the inlet of the refrigerant pump 32.

When: the Rankine cycle is not in operation; the Rankine operation conditions are not met; and the adjustment of the refrigerant distribution is not necessary, the engine controller 71 releases the expander clutch 35 and opens the bypass valve 66 (step S64), and maintains a Rankine non-operating status and resets the timer 1 and the timer 2 (steps S62 and S63).

(a) Details of First Refrigerant Distribution Adjustment

When: the Rankine cycle is not in operation; the Rankine operation conditions are met; and the adjustment of the refrigerant distribution is necessary, the processing proceeds to the step S21, and the engine controller 71 performs the first refrigerant distribution adjustment.

Initially, the engine controller 71 determines whether or not the refrigerant distribution adjustment (including the first refrigerant distribution adjustment and the second refrigerant distribution adjustment) is conducted for the first time during this trip (step S21). If for the first time, then a counter N is reset to be zero (step S22), and if not for the first time, then the counter N is incremented (step S23).

The counter N is a counter adapted to accumulatively count the time when the refrigerant distribution adjustment is conducted. When the first refrigerant distribution adjustment or the second refrigerant distribution adjustment is being conducted, the counter N is kept being incremented, and reset upon the termination of the trip.

Subsequently, the engine controller 71 determines whether or not the distribution adjustment is continued from the previous adjustment (step S24). If the distribution adjustment is not continued from the previous adjustment (i.e., the distribution adjustment is initiated this time), the timer 2 is started (step S25).

Next, the engine controller 71 determines whether or not the counter N is equal to or more than the distribution adjustment completion time (step S26). The distribution adjustment completion time is set to be the operating time required in the refrigerant distribution adjustment for eliminating the uneven distribution of the refrigerant (the driving time of the refrigerant pump 32).

When the counter N is less than the distribution adjustment completion time, the uneven distribution of the refrigerant is not eliminated yet. Thus, the engine controller 71 fastens the expander clutch 35 and drives the refrigerant pump 32, and opens the bypass valve 66 such that the refrigerant bypasses the expander 37 (step S65). With this operation, the refrigerant within the Rankine cycle 31 is circulated, and the refrigerant distribution is adjusted. At this time, as the driving force for driving the refrigerant pump 32, the vehicle inertia force will be utilized if during the deceleration fuel cut, and the driving force of the engine 2 will be utilized if not during the deceleration fuel cut.

When the counter N is equal to or more than the distribution adjustment completion time, the engine controller 71 determines whether or not the timer 2 is equal to or more than a refrigerant preparation completion time (step S66). The refrigerant preparation completion time, which is counted from the initiation of the driving of the refrigerant pump 32, is time required for completing the adjustment of the refrigerant distribution and sufficiently preparing the refrigerant (in the form of liquid) at the inlet of the refrigerant pump 32.

When the timer 2 is less than the refrigerant preparation completion time, the refrigerant is not sufficiently prepared at the inlet of the refrigerant pump 32. Thus, the engine controller 71 fastens the expander clutch 35 and drives the refrigerant pump 32, and opens the bypass valve 66 such that the refrigerant bypasses the expander 37 (step S65). With this operation, the refrigerant is sufficiently prepared at the inlet of the refrigerant pump 32.

When the timer 2 is equal to or more than the refrigerant preparation completion time, the refrigerant is sufficiently prepared at the inlet of the refrigerant pump 32. Therefore, the engine controller 71 fastens the expander clutch 35 and drives the refrigerant pump 32, and closes the bypass valve 66 so that the refrigerant flows to the expander 37 (step S67). Then, the operation of the Rankine cycle 31 is started. In addition, the engine controller 71 resets the timer 1 and the timer 2 (step S68).

(b) Details of Refrigerant Preparation

When: the Rankine is not in operation; the Rankine operation conditions are met; and the refrigerant distribution adjustment is not necessary, the processing proceeds to the step S31, and the engine controller 71 conducts the refrigerant preparation.

Initially, the engine controller 71 determines whether or not the engine 2 is during the deceleration fuel cut (step S31). When the engine controller 71 determines that the engine 2 is not during the deceleration fuel cut, the engine controller 71 further determines whether or not the timer 1 is equal to or more than a limit standby time (step S33).

The limit standby time is set as the upper limit for the standby time after the Rankine operation conditions are met, during which the fuel efficiency is expected to be enhanced by driving the refrigerant pump 32 with the vehicle inertia force. The limit standby time is also set to be longer than the refrigerant preparation completion time. When the limit standby time is exceeded, the impact of the deterioration of the fuel efficiency due to the non-operation of the Rankine cycle 31 increases. Thus, the fuel efficiency is enhanced rather by fastening the expander clutch 35 and driving the refrigerant pump 32 with the driving force of the engine 2.

When the deceleration fuel cut is ongoing, or when the timer 1 is equal to or more than the limit standby time, the engine controller 71 determines whether or not the previous result was also that the deceleration fuel cut was ongoing or that the timer 1 was equal to or more than the limit standby time (step S33). If the previous result was that the deceleration fuel cut was not ongoing or that the timer 1 was less than the limit standby time (i.e., the deceleration fuel cut has turned to ongoing or the timer 1 has turned to equal to or more than the limit standby time during the period from previous time to this time), the timer 2 is started (step S35).

Subsequently, the engine controller 71 determines whether or not the timer 2 is equal to or more than the refrigerant preparation completion time (step S66). When the timer 2 is less than the refrigerant preparation completion time, the refrigerant is not sufficiently prepared at the inlet of the refrigerant pump 32. Thus, the expander clutch 35 is fastened and the refrigerant pump 32 is driven, and the bypass valve 66 is opened such that the refrigerant bypasses the expander 37 (step S65). With this operation, the refrigerant is sufficiently prepared at the inlet of the refrigerant pump 32.

When the timer 2 is equal to or more than the refrigerant preparation completion time, the engine controller 71 fastens the expander clutch 35 and drives the refrigerant pump 32, and closes the bypass valve 66 so that the refrigerant flows to the expander 37 (step S67). Then, the operation of the Rankine cycle 31 is started. In addition, the engine controller 71 resets the timer 1 and the timer 2 (step S68).

When the deceleration fuel cut is not ongoing and the timer 1 is less than the limit standby time, the engine controller 71 determines whether or not the expander clutch 35 is already fastened (step S37). if the expander clutch 35 has been already fastened, the engine controller 71 keeps the expander clutch 35 fastened and the bypass valve 66 open until the timer 2 becomes equal to or more than the predetermined time (steps S66 and S65). If the expander clutch 35 is released, the engine controller 71 keeps the expander clutch 35 released and the bypass valve 66 open (step S69).

(c) Detail of Second Refrigerant Distribution Adjustment

When: the Rankine is not in operation; the Rankine operation conditions are not met; and the refrigerant distribution adjustment is necessary, the processing proceeds to the step S41, and the engine controller 71 conducts the second refrigerant distribution adjustment.

Initially, the engine controller 71 determines whether or not the engine 2 is during the deceleration fuel cut. If not during the deceleration fuel cut, the engine controller 71 releases the expander clutch 35, and opens the bypass valve 66 (step S64). Then, the engine controller 71 maintains the non-operation of the Rankine, and resets the timer 1 and the timer 2 (steps S62 and S63).

If the engine 2 is during the deceleration fuel cut, the engine controller 71 further determines whether or not the refrigerant distribution adjustment (including the first refrigerant distribution adjustment and the second refrigerant distribution adjustment) is conducted for the first time in this trip (step S42). If for the first time, then the counter N is reset to zero (step S43), and if not for the first time, then the counter N is incremented (step S44).

Subsequently, the engine controller 71 determines whether or not the counter N is equal to or more than the distribution adjustment completion time (step S45). If the counter N is equal to or more than the distribution adjustment completion time, the refrigerant distribution adjustment is completed. Thus, the expander clutch 35 is released, and the bypass valve 66 is opened (step S64). Then, the engine controller 71 maintains the non-operation of the Rankine, and resets the timer 1 and the timer 2 (steps S62 and S63).

When the counter N is less than the distribution adjustment completion time, whether or not the second refrigerant distribution adjustment is continued from the previous adjustment is determined (step S46). If the second refrigerant distribution adjustment is not continued from the previous adjustment (i.e., the second refrigerant distribution adjustment is initiated this time), the timer 2 is started (step S67).

The engine controller 71 fastens the expander clutch 35 and drives the refrigerant pump 32, and opens the bypass valve 66 such that the refrigerant bypasses the expander 37 (step S70). Then, the engine controller 71 resets the timer 1 (step S63).

In the description that follows, the advantageous effect obtained by conducting the above preliminary driving control of the refrigerant pump will be described.

According to the preliminary driving control of the refrigerant pump described above, the refrigerant pump 32 is driven prior to the initiation of the operation of the Rankine cycle 31 (steps S65 and S70). As the source of the driving force for the refrigerant pump 32, the vehicle inertia force during the deceleration fuel cut is used, and the driving force of the engine 2 is not consumed. Thus, the fuel efficiency is enhanced as compared to a known technique (Patent Document 1).

When the refrigerant pump 32 is driven, the bypass valve 66 is opened so that the refrigerant bypasses the expander 37 (steps S65 and S70). Thus, the path resistance applied when the refrigerant moves within the Rankine cycle 31 is reduced, and the refrigerant distribution is easily adjusted. Therefore, the refrigerant is more easily liquefied at the inlet of the refrigerant pump 32.

An example of the instance where the refrigerant pump 32 is driven prior to the start of the operation of the Rankine cycle 31 is an instance where the Rankine operation conditions are met. The refrigerant pump 32 is driven with use of the vehicle inertia force during the deceleration fuel cut, and the refrigerant (in the form of liquid) is sufficiently prepared at the inlet of the refrigerant pump 32 (Y in the steps S12 and S31, and step S65). Since the driving force of the engine 2 is not consumed, the fuel efficiency is not deteriorated.

However, when the deceleration fuel cut is not initiated even upon the lapse of the limit standby time after the Rankine operation conditions are met, the refrigerant pump 32 is driven with use of the driving force of the engine 2 (Y in the step S32, step S65). Thus, the configuration prevents the deterioration of the fuel efficiency caused by the long-standing non-operation of the Rankine cycle while the Rankine operation conditions are met.

In this embodiment, when the deceleration fuel cut is not initiated even upon the lapse of the limit standby time after the Rankine operation conditions are met, the refrigerant pump 32 is driven with use of the driving force of the engine 2. Alternatively, the refrigerant pump 32 may be driven with use of the driving force of the engine 2 when the deceleration fuel cut is not initiated even though the traveling distance after the Rankine operation conditions are met has reached a predetermined distance.

Further, once the driving of the refrigerant pump 32 is started in synchronization with the deceleration fuel cut, even when the deceleration fuel cut is terminated in the middle, the driving of the refrigerant pump 32 is continued by switching the driving from the driving with vehicle inertia force to the driving with driving force of the engine 2, until the refrigerant is sufficiently prepared at the inlet of the refrigerant pump 32 (N in the step S31, Y in the step S37, step S65). By this operation, the refrigerant is reliably and sufficiently prepared at the inlet of the refrigerant pump 32 prior to the initiation of the operation of the Rankine cycle 31.

FIG. 9 is a timing diagram depicting a situation where a Rankine operation conditions are satisfied while traveling. In this example, the accelerator pedal is released at the time t11, and after a cut-in delay time, the deceleration fuel cut is initiated at the time t12. In addition, the Rankine operation conditions are met at the time t12.

According to the preliminary driving control of the refrigerant pump described above, the expander clutch 35 is fasted and the driving of the refrigerant pump 32 is initiated at the time t12. The refrigerant pump 32 is driven with use of the vehicle inertia force during the deceleration fuel cut. Thus, the consumption of the driving force of the engine 2 is reduced by the amount indicated by the shaded area in the figure, as compared to the configuration where the refrigerant pump 32 is driven with use of the driving force of the engine 2. Therefore, the fuel efficiency is enhanced.

During the operation of the refrigerant pump 32, the bypass valve 66 is opened. With this arrangement, the refrigerant bypasses the expander 37, and the path resistance applied to the refrigerant moving within the Rankine cycle 31 is reduced. Thus, the refrigerant distribution is more easily adjusted, and the refrigerant is more easily liquefied at the inlet of the refrigerant pump 32.

Thereafter, when the refrigerant (in the form of liquid) is sufficiently prepared at the inlet of the refrigerant pump 32 at the time t13, the operation of the Rankine cycle 31 is started.

At the time t14, with the accelerator pedal stepped on, a lock-up clutch is fastened, and the fuel injection is resumed.

Further, an example of the instance where the refrigerant pump 32 is driven prior to the start of the operation of the Rankine cycle 31 is an instance where: upon the determination that the refrigerant distribution needs to be adjusted (i.e., the determination that the uneven distribution of the refrigerant is present) with the Rankine operation conditions not satisfied, the refrigerant pump 32 is driven with use of the vehicle inertia force during the deceleration fuel cut in order to adjust the refrigerant distribution in the Rankine cycle 31 (N in the step S12, Y in the steps S16 and S41, step S70). Since the driving force of the engine 2 is not consumed, the fuel efficiency is not deteriorated.

When the deceleration fuel cut is terminated before the completion of the refrigerant distribution adjustment, the driving of the refrigerant pump 32 is terminated, and the refrigerant distribution adjustment is also terminated (N in the step S41, step S64). Since the Rankine operation conditions are not met, there will be no effect such as the delay in the start of the operation of the Rankine cycle 31. By resuming the driving of the refrigerant pump 32 at the timing of the next deceleration fuel cut, the deterioration of the fuel efficiency is suppressed.

The adjustment of the refrigerant distribution is conducted when the Rankine cycle 31 is not operated at all during one trip, or when the accumulated value of time during which the refrigerant distribution adjustment (including the first refrigerant distribution adjustment and the second refrigerant distribution adjustment) is conducted is less than the distribution adjustment completion time (Y in the step S15 or S16). When a long time elapses after the termination of the trip and before the start of the next trip, uneven distribution of the refrigerant occurs. However, by conducting the above-described control, the refrigerant distribution is adjusted in any trip.

By measuring the time elapsed, the distance traveled or the like after the previous adjustment was completed, the adjustment of the refrigerant distribution may be conducted when the time elapsed, the distance traveled or the like reaches a predetermined value (i.e., time, distance or the like where the refrigerant may be unevenly distributed).

FIG. 10 is a timing diagram depicting a situation where the refrigerant pump 32 is driven to adjust the distribution of the refrigerant while the Rankine operation conditions are not satisfied. In this example, the accelerator pedal is released at the time t21, and after a cut-in delay time, the deceleration fuel cut is initiated at the time t22.

According to the preliminary driving control of the refrigerant pump described above, when the adjustment of the refrigerant distribution is necessary, the expander clutch 35 is fastened, and the refrigerant pump 32 is driven with use of the vehicle inertia force during the deceleration fuel cut, as depicted in the figure. With this arrangement, the consumption of the driving force of the engine 2 is reduced by the amount indicated by the shaded area in the figure, as compared to the configuration where the refrigerant pump 32 is driven with use of the driving force of the engine 2. Therefore, the fuel efficiency is enhanced.

Further, during the operation of the refrigerant pump 32, the bypass valve 66 is opened. Thus, the refrigerant bypasses the expander 37, and the path resistance is reduced. Accordingly, the refrigerant distribution is more easily adjusted, and the refrigerant is more easily liquefied at the inlet of the refrigerant pump 32.

Subsequently, when the rotation speed of the engine 2 is reduced to a fuel cut recovery rotation speed at the time t23, the lock-up clutch is released, and the fuel injection is resumed. In response thereto, the expander clutch 35 is released, and the driving of the refrigerant pump 32 is terminated.

The embodiments of the invention are described above. However, the above embodiments are merely examples in which the aspect of the invention is applied, and nothing herein shall limit the technical scope of the invention to the specific configuration of the above embodiments.

In the above embodiments, the refrigerant pump 32 is driven with use of the vehicle inertia force during the deceleration fuel cut. However, the refrigerant pump 32 may be driven with use of the vehicle inertia force, only during the deceleration fuel cut conducted after the operation point of the engine 2 enters a high load zone or a high rotation speed zone and the Rankine operation conditions are met.

As long as the refrigerant pump 32 is driven with use of the vehicle inertia force under the above operation conditions, when the load of the engine 2 or the rotation speed of the engine 2 is reduced and the Rankine operation non-operating conditions are cancelled, the operation of the Rankine cycle 31 is rapidly started. While the friction of the expander 37 is great under the above operation conditions, the friction of the expander 37 will not matter because the situation does not require a positive output.

In the above embodiments, the preliminary driving of the refrigerant pump is conducted during the deceleration fuel cut, but may be conducted not during the deceleration fuel cut. As long as the deceleration is conducted, the refrigerant pump 32 may be driven with use of the vehicle inertia force to some extent even without any fuel cut. Therefore, fuel consumption for the refrigerant adjustment or the refrigerant preparation is suppressed. Whether or not the deceleration is conducted is determined from a lack of the intention to accelerate (e.g., the driver's release of the accelerator). In the hybrid vehicle described in the embodiment, even when the power transmission path between the engine and the driving wheels is disconnected during the deceleration (the first driving shaft clutch 86 is switched off), the preliminary driving of the refrigerant pump is conducted with use of the vehicle inertia force by keeping the first driving shaft clutch 86 fastened also during the deceleration, at the time of implementing the invention.

This application claims the priority of Japanese Patent Application No. 2011-216752 filed in Japan Patent Office on Sep. 30, 2011, the entire disclosure of which shall be incorporated herein by this reference.

The invention claimed is:

1. A Rankine cycle system for a vehicle driven by an engine that is cooled by refrigerant, the system comprising:
a refrigerant pump installed in the vehicle and circulating the refrigerant;
a heat exchanger collecting waste heat of the engine with the refrigerant;
an expander converting the waste heat collected with the refrigerant into driving force by expanding the refrigerant;
a condenser condensing the refrigerant expanded by the expander;
a power transmission path extending from the engine to the refrigerant pump, the power transmission path including a clutch;
a refrigerant path circulating the refrigerant among the refrigerant pump, the heat exchanger, the expander, and the condenser;
a bypass path connected to the refrigerant path to make the refrigerant bypass the expander; and
a controller configured to
determine whether a Rankine cycle operation condition is met;
perform a Rankine cycle operation of the Rankine cycle system, in which the clutch is fastened and the refrigerant pump is driven with a driving force of the engine while circulating the refrigerant through the refrigerant path without making the refrigerant bypass the expander, when the Rankine cycle operation condition is met; and
perform, prior to performing the Rankine cycle operation, a preliminary operation of the Rankine cycle system, in which the clutch is fastened and the refrigerant pump is driven with a vehicle inertia force while causing the bypass path to make the refrigerant bypass the expander, during deceleration of the vehicle.

2. The Rankine cycle system according to claim 1, further comprising:
a bypass valve in the bypass path,
wherein the controller is further configured to open the bypass valve to cause the bypass path to make the refrigerant bypass the expander.

3. The Rankine cycle system according to claim 1, wherein the controller is further configured to:
cause the bypass path to make the refrigerant bypass the expander to accumulate the refrigerant at an inlet of the refrigerant pump.

4. The Rankine cycle system according to claim 3, wherein the controller is further configured to:
fasten the clutch and drive the refrigerant pump with the driving force of the engine while causing the bypass path to make the refrigerant bypass the expander, when no deceleration of the vehicle is conducted even upon a lapse of a predetermined time after the Rankine cycle operation condition is met.

5. The Rankine cycle system according to claim 3, wherein the controller is further configured to:
keep the clutch fastened and drive the refrigerant pump with the driving force of the engine while causing the bypass path to make the refrigerant bypass the expander, when the deceleration of the vehicle is terminated before the refrigerant is accumulated at the inlet of the refrigerant pump during the preliminary operation.

6. The Rankine cycle system according to claim 1, wherein the controller is further configured to:
perform the preliminary operation to eliminate an uneven distribution of the refrigerant in the Rankine cycle system, during the deceleration of the vehicle when the Rankine cycle operation condition is not met.

7. The Rankine cycle system according to claim 6, wherein the controller is further configured to:
determine whether or not the uneven distribution of the refrigerant is present in the Rankine cycle system; and
release the clutch and terminate operation of the refrigerant pump, when the deceleration of the vehicle is terminated before the uneven distribution of the refrigerant in the Rankine cycle system is eliminated.

8. The Rankine cycle system according to claim 6, wherein the controller is further configured to:
determine whether or not the uneven distribution of the refrigerant is present in the Rankine cycle system, and
when the Rankine cycle operation condition is not met and the uneven distribution of the refrigerant is present in the Rankine cycle system, perform the preliminary operation of the Rankine cycle system during the deceleration of the vehicle, to eliminate the uneven distribution of the refrigerant in the Rankine cycle system.

9. The Rankine cycle system according to claim 1, wherein the controller is further configured to:
prevent the Rankine cycle operation from being performed in a high load zone or a high rotation speed zone of the engine; and
perform the preliminary operation only when the deceleration of the vehicle is accompanied by a fuel cut of the engine performed in the high load zone or high rotation speed zone.

10. The Rankine cycle system according to claim 1, wherein the vehicle comprises an air conditioner associated with a freezer cycle system, and the Rankine cycle system shares the condenser and the refrigerant with the freezer cycle system.

* * * * *